(12) United States Patent
Nethery

(10) Patent No.: US 11,238,136 B2
(45) Date of Patent: Feb. 1, 2022

(54) DETECTING UNAUTHORIZED ACCESS TO SECURE DEVICES

(71) Applicant: Stanton Kee Nethery, Sebastopol, CA (US)

(72) Inventor: Stanton Kee Nethery, Sebastopol, CA (US)

(*) Notice: Subject to any disclaimer, the term of this patent is extended or adjusted under 35 U.S.C. 154(b) by 106 days.

(21) Appl. No.: 16/856,025

(22) Filed: Apr. 23, 2020

(65) Prior Publication Data

US 2020/0342074 A1    Oct. 29, 2020

Related U.S. Application Data

(60) Provisional application No. 62/838,856, filed on Apr. 25, 2019.

(51) Int. Cl.

| | |
|---|---|
| *G06F 21/12* | (2013.01) |
| *G06F 21/51* | (2013.01) |
| *G06F 21/73* | (2013.01) |
| *G06F 21/16* | (2013.01) |
| *G06F 7/58* | (2006.01) |
| *G06K 19/06* | (2006.01) |
| *G06F 21/60* | (2013.01) |

(52) U.S. Cl.
CPC .............. *G06F 21/12* (2013.01); *G06F 7/582* (2013.01); *G06F 21/16* (2013.01); *G06F 21/51* (2013.01); *G06F 21/602* (2013.01); *G06F 21/73* (2013.01); *G06K 19/06037* (2013.01); *G06F 2221/0751* (2013.01)

(58) Field of Classification Search
CPC ........ G06F 21/602; G06F 21/73; G06F 21/12; G06F 21/16; G06F 21/51; G06F 2221/2103; G06F 2221/2137; G06F 7/58; G06F 7/582; G06K 19/06037
See application file for complete search history.

(56) References Cited

U.S. PATENT DOCUMENTS

| | | | |
|---|---|---|---|
| 10,630,534 B1 * | 4/2020 | Pawaskar | H04L 41/06 |
| 2004/0100652 A1 * | 5/2004 | Cooper | G06K 17/00 358/1.15 |
| 2013/0007024 A1 * | 1/2013 | Plattner | G06Q 10/08 707/754 |
| 2015/0150084 A1 * | 5/2015 | Kiperberg | G06F 21/577 726/3 |
| 2015/0356560 A1 * | 12/2015 | Shastry | G06Q 20/401 705/64 |
| 2019/0334730 A1 * | 10/2019 | Endress | H04L 67/1042 |

\* cited by examiner

*Primary Examiner* — Trang T Doan
(74) *Attorney, Agent, or Firm* — Steven Stupp

(57) ABSTRACT

This Application describes devices, and techniques for using them, capable of allowing valid access to targeted device data without the owner's consent, while still informing the owner whenever any invalid access has occurred. In one embodiment, each targeted device's data is protected by several techniques: (A) maintaining protected data on the targeted device encrypted, thus preventing hardware or software access without authorization; (B) maintaining encryption keys for protected data in a "secure enclave", not software accessible without authorization, and not hardware accessible without substantial effort; (C) maintaining the secure enclave within a tamper-evident enclosure, the tamper-evident enclosure having a unique identifier that is not easily duplicable; and (D) providing relatively easy retrieval of the unique identifier and checking that the unique identifier has not been altered.

20 Claims, 7 Drawing Sheets

Method 200 Part II

Figure 3: Method 200 Part I

Figure 4: Method 200 Part II

Figure 6: Method 400

DETECTING UNAUTHORIZED ACCESS TO SECURE DEVICES

CROSS REFERENCE TO RELATED APPLICATIONS

This application claims priority under 35 U.S.C. 119(e) to U.S. Provisional Application Ser. No. 62/838,856, entitled "Detecting Unauthorized Access to Secure Devices," by Stanton Kee Nethery, filed on Apr. 25, 2019, the contents of which are herein incorporated by reference.

BACKGROUND

Field of the Disclosure

This Application generally describes techniques relating to detecting unauthorized access to secure devices, and other issues.

Related Art

Smartphones and other mobile devices sometimes maintain large amounts of data that their owners regard as private. However, law enforcement (and other entities) would often like to review that data. For example, law enforcement may wish to review the data as evidence or as part of an investigation. However, other entities, sometimes malicious, may attempt to access and use the data for less virtuous ends.

One problem that has arisen is that protecting smartphone data from malicious entities can prevent law enforcement, and other valid authorities, from valid access. For example, when data is protected by encryption and a password, the smartphone owner can deny access to valid authorities by refusing to release the password. Some governments, desiring law enforcement to have access to data on smartphones and other secure devices, have even banned use of strong encryption by civilians. On the other hand, disallowing use of encryption of secure data for personal devices, or providing another method of access to smartphone data that does not require the password (sometimes called a "backdoor") would allow malicious entities who discover that backdoor to access that data improperly.

For example, backdoors that can be used without physical possession of the smartphone, sometimes called "software backdoors", may be used by malicious entities who are unknown to the smartphone's owner. Software backdoors may be used whenever the smartphone is coupled to a network, including a cell phone network or the Internet.

Software backdoors may even be used without the owner knowing they were used; this may lead to the owner continuing to maintain private data on their smartphone even when it is already compromised.

In contrast, backdoors that can be used only when having physical possession of the smartphone, sometimes called "hardware backdoors", can be more easily used by law enforcement, such as when executing a search warrant. Consequently, malicious entities would need to physically capture the smartphone before they could access its data. In either case, even though actually preventing someone who has physical possession of the smartphone from accessing its data may not, in general, be practical, the user would want to know whenever this occurs.

Each of these issues, as well as other possible considerations, may cause difficulty in aspects of providing valid access to smartphone data without the owner's consent, while still denying access to that data to malicious entities. Moreover, each of these issues, as well as other possible considerations, may cause difficulty in aspects of assuring the owner's knowledge whenever their smartphone data is accessed, whether validly or not.

SUMMARY OF THE DISCLOSURE

This summary of the disclosure is provided as a convenience to the reader, and does not limit or restrict the scope of the disclosure or the embodiments. This summary is intended as an introduction to more detailed description found in this Application, and as an overview of techniques explained in this Application. The described techniques have applicability in other fields and beyond the embodiments specifically reviewed in detail.

This Application describes devices, and techniques for using them, capable of allowing valid access to secure device data without the owner's consent, while still informing the owner whenever any invalid access has occurred.

In one embodiment, each secure device's data is protected by several techniques:

(A) maintaining protected data encrypted on the secure device, thus preventing hardware or software access without authorization;

(B) maintaining encryption keys for protected data in a "secure enclave" (which may include a physically isolated processor and associated memory), not software accessible without authorization, and not hardware accessible without substantial effort;

(C) maintaining the secure enclave within a tamper-evident enclosure, the tamper-evident enclosure having a unique identifier that is not easily duplicable;

(D) providing relatively easy retrieval of the unique identifier and checking that the unique identifier has not been altered.

In one embodiment, the secure enclave maintains a unique identifier that can only be utilized using a challenge/response procedure from a second device. The second device can maintain information with respect to the challenge/response, so as to assure that whenever the unique identifier changes, the challenge/response is also changed.

Techniques (A) and (B) can prevent access to the target device's data without authorization. Software access would require either breaking the encryption or obtaining encryption codes from an authorized user; this is intended to be infeasible. Hardware access would require deconstructing the target device, which would then become known to the mobile device's owner; this is intended to be reliably detectable by the device's owner.

Techniques (C) and (D) can prevent access to the target device's data without that access being evident to the device's owner. Access to the secure enclave would alter the tamper-evident enclosure, which would alter the unique identifier. Because the result of some function involving the unique identifier can be relatively easily retrieved from the target device, the owner can relatively easily determine whether unauthorized access has occurred, even if an attacker has entirely deconstructed and rebuilt the target device.

For example, the tamper-evident enclosure can include a random (or pseudo-random) distribution of reflective or phosphorescent bits, such as glitter. Alternatively, the tamper-evident enclosure can include a random distribution of fuses or magnets. Either such random distribution can be disposed to provide a random response when challenged with a known input pattern, whether light or other electromagnetic signals. The particular challenge need not be predetermined; the tamper-evident enclosure effectively provides a one-way function from challenge to response.

This challenge/response can be maintained in storage outside the target device without any of the device's data or passwords being associated with anyone other than the owner. Even authorized users who are not the owner need not have the challenge/response information. The owner can later perform the same challenge/response and determine whether the tamper-evident enclosure has been altered. Even if an attacker has rebuilt the entire target device, the challenge/response will differ, and the owner can determine that the target device has been compromised.

In one embodiment, this Application describes challenge/response techniques that use random predetermined disposition of light (such as reflection, refraction, phosphorescence, or otherwise), or random predetermined disposition of electromagnetic signals (such as current, voltage, non-visible electromagnetic signals, or otherwise), or other random predetermined disposition of inputs to outputs, to provide a one-way function. However, in the context of the embodiments, there is no particular requirement for any such limitation. The challenge/response need not be predetermined, such as when the one-way function includes a response with a probability distribution, or includes a response with a distribution having a quantum effect, or otherwise provides a challenge/response, any of which are substantially difficult for an attacker to alter. The challenge/response need not be unique to any particular challenge, such as when the response is uniform, or is selected from a known set of possible responses, or otherwise provides a response, any of which are substantially difficult for an attacker to alter.

BRIEF DESCRIPTION OF THE FIGURES

In the figures, like references generally indicate similar elements, although this is not strictly required.

Figure 1:
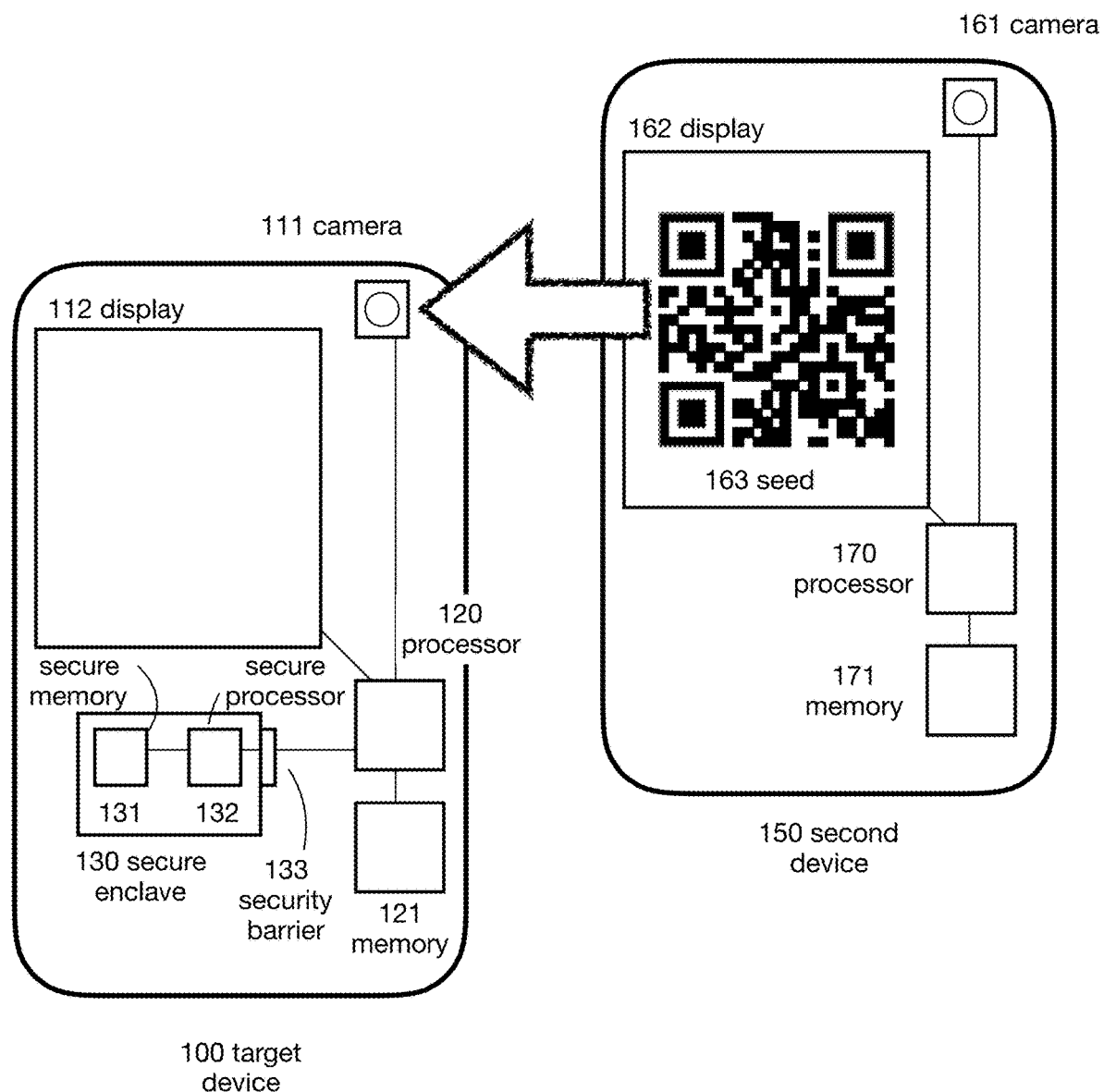
FIG. 1 shows a conceptual drawing of an example security challenge from a second device to a target device.

After reading this Application, those skilled in the art would recognize that the figures are not necessarily drawn to scale for construction, nor do they necessarily specify any particular location or order of construction.

DETAILED DESCRIPTION

As further described herein, this Application describes devices and techniques which can allow valid access to device data without the owner's consent, while still informing the owner whenever any invalid access has occurred. For example, valid access to device data occurs when the owner provides any necessary keys or passwords to unlock the device. Invalid access to device data occurs when an attacker is able to unlock the device, or otherwise access its data, without authorization by the owner.

In one embodiment, a device is disposed to prevent any access to its data without a key, password, or other authorization element. For example, when the device is a smartphone, it can maintain itself locked and disallow use (except possibly for emergency calls) without entry of a proper password or authentication information (such as biometric password). In such cases, the device can maintain itself secure against attacks from outside the device. For example, the device can maintain a unique identifier or other secure data, and its own copy of its passwords in a secure enclave; this can have the effect that attacks on the device's security should require physical access to the secure enclave, or at least require physical access to the device (as further described in the Incorporated Disclosures).

In order to obtain unauthorized access, an attacker would take physical possession of the device, disassemble it, and access the device's data by direct access to memory or processor elements, or at least by physical access to the device (as further described in the Incorporated Disclosures). In one embodiment, the device maintains the secure enclave within a tamper evident enclosure; this can have the effect that physical attacks on the secure enclave can be seen by examination of the tamper evident enclosure.

As further described herein, the tamper evident enclosure includes a unique identifier, such as embodied in a random (or pseudo-random) distribution of reflective or phosphorescent bits, such as glitter, or a random distribution of fuses or magnets, or another pattern that cannot easily be replicated. When light is shined on glitter, a reflective pattern can be provided that is substantially unique to the pattern of glitter and a pattern of incoming light. Because the reflective pattern is substantially unique to the pattern of glitter and the challenge pattern of incoming light, and because the pattern of glitter is difficult to replicate, an attacker piercing the tamper evident enclosure would cause the reflective pattern provided after the attack to differ from what it was before the attack.

The device's owner can maintain a record of a "challenge", such as a selected data pattern, data sequence, pattern of incoming light, or otherwise; and its associated "response", such as a selected responsive data pattern, responsive data sequence, reflective pattern in response to the incoming light, or otherwise. When the device's owner suspects that the device has been attacked (physically or otherwise as further described in the Incorporated Disclosures), the owner can repeat the challenge/response to determine if the response has changed. If the response has changed, the owner has good evidence that the tamper evident enclosure has been pierced (or that the device has been successfully attacked as further described in the Incorporated Disclosures). Alternatively, if the response has not changed, the owner has good evidence that the tamper evident enclosure has not been pierced (and that the device has not been successfully attacked as further described in the Incorporated Disclosures).

This can have the effect that the random distribution on the tamper evident enclosure can act as a one-way function, similar to a hash function, or similar to encryption when the password is not known. The challenge/response is easily performed, does not require substantial resources, and the result can be easily confirmed for accuracy. Moreover, the challenge/response can be maintained outside the target device, even on another second device (even one belonging to a stranger or a third party), without compromising any data or passwords.

Terms and Phrases

The phrase "target device", and variants thereof, generally refers to any device disposed to maintain data, such as secure data reserved for access by an owner or user of the device. For example, a target device can include a smartphone, an MP3 player, a laptop or notebook computer, a desktop computer or other computing device, a computing tablet or phablet, a wearable or implantable device, a mobile computing device, an electronic device or any other device disposed with capabilities as further described herein.

The phrase "second device", and variants thereof, generally refers to any device disposed to maintain data, such as a relatively mobile computing device (or other computing device) or another type of device, such as any of the devices described with respect to the phrase "target device", and disposed to interact with a target device to maintain challenge/response information, or any other device disposed with capabilities as further described herein.

The term "random", and variants thereof, generally refers to any process or technique having a substantially non-predictable result, and includes pseudo-random processes and functions.

The phrase "challenge/response", and variants thereof, generally refers to any process or technique in which two devices exchange a challenge portion, including a first set of data, and a response portion, including a second set of data, and in which the response portion matches an expected set of data associated with the challenge portion.

The phrases "one-way function", "secure hash", and variants thereof, generally refer to any process or technique in which a first set of data is transformed into a second set of data, and in which the first set of data cannot easily be determined from the second set of data by a recipient thereof. For example, encryption of the first set of data to provide the second set of data, in which the encryption key is unknown to the recipient, can be considered a one-way function.

FIGURES AND TEXT

Devices can include elements as described herein. While the elements are shown and described in particular locations, with particular sizes, and disposed in particular configurations, in the context of the embodiments, there is no particular requirement for any such limitation. Except where explicitly stated, the figures are not necessarily drawn to scale, and there is no particular requirement for the elements to be located or disposed as shown.

Methods of operation can include operations as described herein. While the operations are shown and described in a linear order, in the context of the embodiments, there is no particular requirement for any such limitation. Except where explicitly stated, there is no particular requirement for the operations to be encountered or performed linearly, or in any particular order or by any particular device. For example, and without limitation, the operations can be encountered or performed in parallel, in a pipelined manner.

Security Challenge

FIG. 1 shows a conceptual drawing of an example security challenge from a second device to a target device.

As further described herein, the devices discussed herein can include a target device 100, such as a possible target of a security attack, and a second device 150, such as disposed to maintain data resulting from a security challenge/response. The second device 150 and the target device 100 can perform the challenge/response. A result of the challenge/response can be maintained by the second device 150, such as in a storage module therein. The second device 150 can later confirm whether the target device 100 has been successfully attacked, such as by comparing a result of a second challenge/response with the stored result of the first challenge/response.

The target device 100 is described with respect to elements as shown in the figure, and as otherwise described herein, such as:
  a camera 111, an image sensor or another input element, as further described herein;
  a display 112, or another output element, as further described herein;
  a processor 120, possibly coupled to one or more memory elements 121 such as RAM (random access memory), SSD (solid state devices), or other types of storage;
  a secure enclave 130, such as further described herein, possibly including one or more physical elements such as a secure memory 131 (as further described herein), a secure processor 132, and a security barrier 133;
  other elements, as further described herein, for possible use to perform functions described herein, or otherwise.

The second device 150 is also described with respect to elements as shown in FIG. 1, and as otherwise described herein, such as another camera 161, another display 162, another processor 170, another memory 171, and possibly other elements, as further described herein, or otherwise. In one embodiment, the second device 150 interacts with the target device 100 using a seed 163, an example of which is shown in the figure as a QR code.

While the second device's camera 161, display 162, processor 170, memory 171, and possibly other elements can be similar to the target device's elements, in the context of the embodiments, there is no particular requirement for any such limitation. For example, the second device 150 can be substantially different from the target device 100, so long as the target device 100 and the second device 150 can collectively perform the functions described herein. Because, as further described herein, the primary interaction between the target device 100 and the second device 150 use the data represented by the seed 163, there is no particular requirement that the target device 100 and the second device 150 need to be identical or even similar.

In the target device 100, the camera 111, or another input element, can be coupled to the processor 120. The processor 120 can be disposed to receive information from the camera 111, such as the seed 163 received from the second device 150. The processor 120 can be disposed to maintain the seed 163 in the memory 121, such as temporarily during processing by the secure enclave 130. The processor 120 can be disposed to present the seed 163 to the secure enclave 130 at the latter's security barrier 133.

As further described herein, the secure enclave 130 can be disposed to require substantial effort by an attacker to penetrate. In one embodiment, the secure enclave 130 can be disposed to require all its inputs to be presented at the security barrier 133, where they can be received by the secure processor 132. The secure processor 132 can, possibly using the secure memory 131, perform some or all security operations on the target device 100. For example, the secure enclave 130 can be disposed to perform some or all of the target device's encryption/decryption operations, secure one-way functions, or hash encoding operations, and challenge/response operations.

While this Application primarily describes the input element as a still camera 111 disposed to receive the seed 163 in the form of a QR code (and, more generally, a one or two-dimensional barcode) or another still picture or image, in the context of the embodiments, there is no particular requirement for any such limitation. In one embodiment, the input element can include any other sensor disposed to receive data from another device such as the second device 150. For example, the input element can include a motion picture camera; a microphone; another type of electromagnetic receiver such as a NFC (near-field communication) device, an RFID (radio frequency identifier) device, a Wi-Fi device, or a cellular modem; a haptic information receiver such as an accelerometer; or otherwise.

Moreover, while this Application primarily describes the input element and a corresponding output element as using the same modes of information transmission (in the primary description, a still picture in response to a still picture), in the context of the embodiments, there is no particular requirement for any such limitation. For example, the challenge portion of the challenge/response can include a still picture or image, while the response portion of the challenge/response can include information transmission in another mode (such as an audio signal in response to a still picture or image, a haptic signal such as generated by a buzzer or vibrator in response to an NFC signal, or otherwise, e.g., an electromagnetic signal).

In one embodiment, when the processor 120 presents the seed 163 to the secure enclave's security barrier 133, the secure enclave 130 can receive the challenge portion of the challenge/response in response to the seed 163. For example, the secure enclave 130 can treat the seed 163 as the challenge, can generate or can use a predetermined secure one-way function, or a hash function, of the seed 163, and treat a result of the secure one-way function or a result of the hash function, as the challenge, or otherwise. In response to the challenge, the secure processor 132 and the secure memory 131 can generate the response portion of the challenge/response. The response can be sent from the security barrier 133 to the target device's processor 120. The target device's processor 120 can present the response as a result 114 on the display 112 of the target device 100.

Security Response

Figure 2:
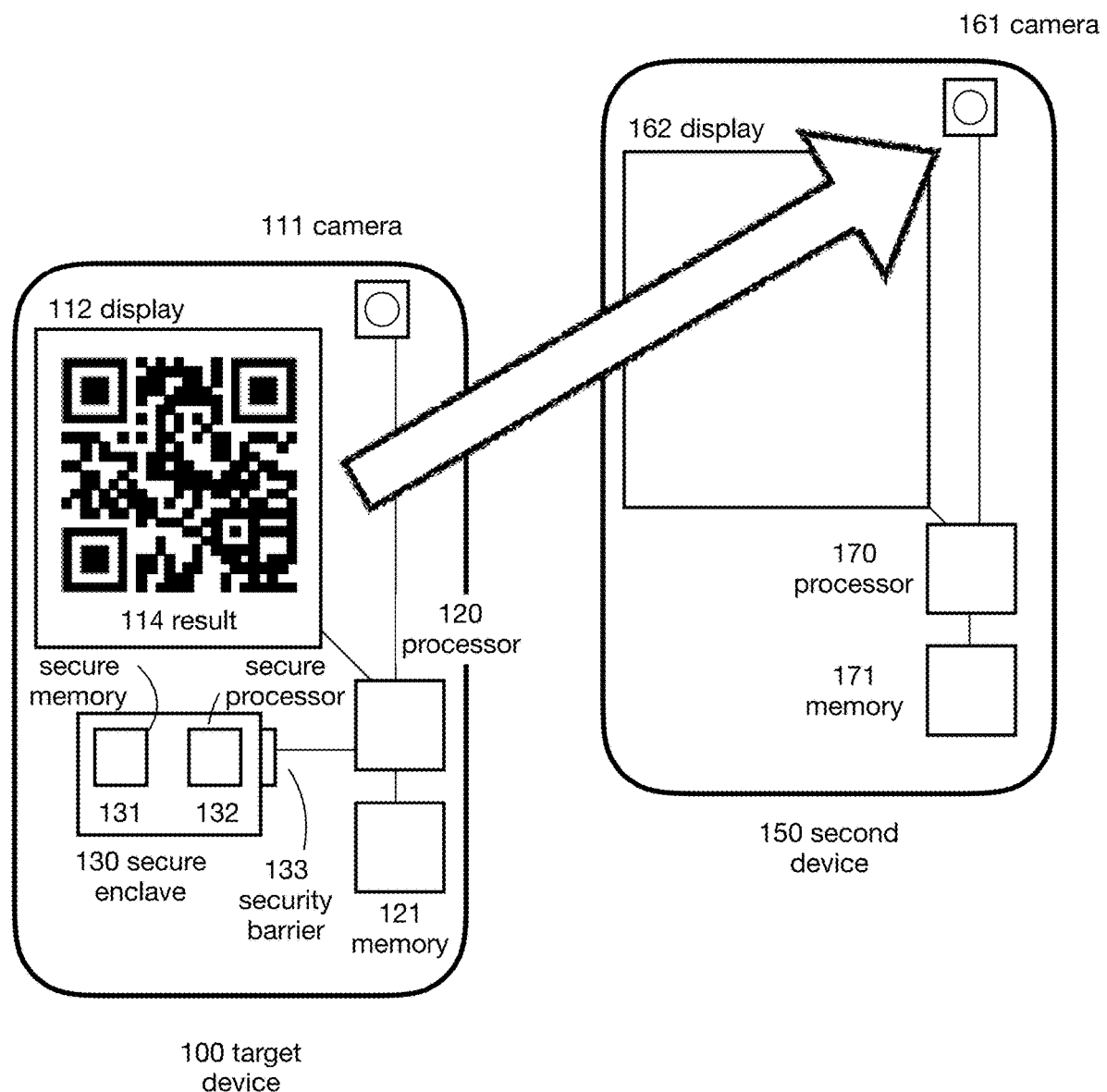
FIG. 2 shows a conceptual drawing of an example security response from a target device to the second device.

FIG. 2 shows a conceptual drawing of an example security response from the target 100 device to the second device 150.

As further described herein, the target device's processor 120 can present the result 114 on the target device's display 112. The second device 150 can be disposed to receive the result 114 at its camera 161. The second device's camera 161 can be coupled to the second device's processor 170. The second device's processor 170 can store and maintain the result 114, or a value in response thereto, in the second device's memory 171 as the response portion of the challenge/response. For example, the second device's processor 170 can treat the result 114 itself as the response, can generate or can use a predetermined secure one-way function, or a hash function, of the result 114 and treat a result of the secure one-way function, or a result of the hash function, as the response, or otherwise. The second device 150 can maintain both the challenge portion and the response portion of the challenge/response in its memory 171, such as associated with an identifier of the target device 100.

Recording Challenge/Response

Figure 3:
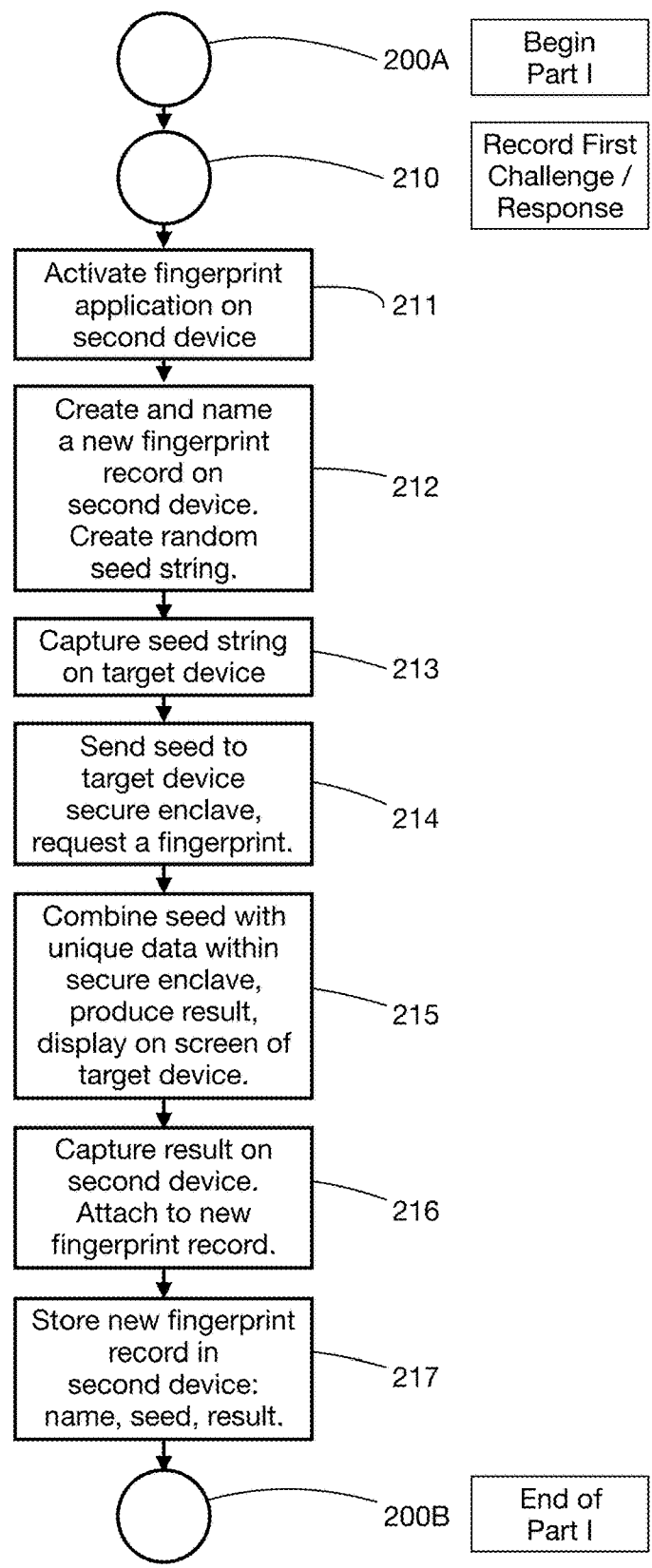
FIG. 3 shows a conceptual drawing of an example method of recording a first challenge/response between the target device and the second device.

FIG. 3 shows a conceptual drawing of an example a method 200 of recording and comparing a challenge/response between the target device 100 and the second device 150.

The method 200 includes flow points and method operation as shown in FIG. 3, and as otherwise described herein, such as:

a flow point 200A, in which the method 200 is ready to begin part I (recording the first challenge/response);

a flow point 210, in which the method 200 is ready to record a first challenge/response associated with the target device 100;

a flow point 200B, in which the method 200 is ready to finish part I.

Beginning of Part I

The flow point 200A indicates that the method 200 is ready to begin part I (recording the challenge/response).

The flow point 200A can be triggered by one or more of the following:

an alert from the target device 100 or from the second device 150, such as when the target device 100 or the second device 150 is powered on or activated;

a selected location with respect to the target device 100 and the second device 150, or otherwise;

a user input from the target device 100 or the second device 150, such as when a selected function of the target device 100 is completed (such as selected sequence of key presses or a selected sequence of gestures on a smartphone touch-sensitive display);

a message from an external device, such as an SMS or MMS message, a Wi-Fi connection, a location device, or otherwise, or as otherwise described herein.

The method 200 can proceed with the next flow point.

Recording the First Challenge/Response

The flow point 210 indicates that the method 200 is ready to record a first challenge/response associated with the target device 100.

At an operation 211, an initiator of the challenge/response can activate a device fingerprint "app" (program application) on the second device 150 (and, more generally, an identification "app"). The fingerprint app can collect information substantially unique to the target device 100 and can generate a UID (unique identifier) in response thereto. The initiator can include an owner of the second device 150, or another person. For example, the person activating the device fingerprint app can activate a touch element, such as a button or a capacitive touch element, or can activate a voice input, such as Apple's Siri™ function or otherwise, can activate a haptic input, such as using a shaking motion or using a gesture with the second device 150, can trigger the device fingerprint app using a conditional operation such as IFTTT ("if this, then that"), or can otherwise activate the device fingerprint app.

Alternatively, the second device 150 can be disposed so as to activate the device fingerprint app when the target device 100 and the second device 150 are disposed so as to couple the target device 100 and the second device 150 to allow a challenge/response operation, such as when the target device 100 and the second device 150 are in proximity of each other, e.g., within at least wireless communication range of each other.

At an operation 212, the initiator of the challenge/response can trigger the device fingerprint app to create a new 'fingerprint' record, to be associated with the target device 100. As part of this operation, the initiator can name the target device 100, or otherwise associate the target device 100 with a mnemonic so as to be able to recall the correct fingerprint record.

As part of this operation, the device fingerprint app can generate a substantially random seed 163. As shown in FIG. 1, the substantially random seed 163 can be represented as a QR code on the second device's display 162. However, in the context of the embodiments, there is no particular requirement for any such limitation. For example, the substantially random seed 163 can be presented on the second device's display 162 as a bar code or sequence of bar codes, as a still photograph or image having identifiable elements, as a motion picture, or as a code having elements other than only visible ones, or otherwise.

The seed 163 can be used to generate the challenge portion of the challenge/response. For example, the seed 163 itself can be used as the challenge portion, or the device fingerprint app can generate or can use a predetermined secure one-way function, or a hash function, encoding of the seed and use a result of the secure one-way function, or a result of the hash function, as the challenge portion, or otherwise. The device fingerprint app can present the challenge for receipt by the target device 100, such as by displaying the challenge on the display of the second device 150.

At an operation 213, a responder to the challenge/response can activate a device identifier app on the target device 100. The responder can include an owner of the target device 100, or another person. For example, the person activating the device identifier app can do so in a similar manner as the initiator of the device fingerprint app. However, in the context of the embodiments, there is no particular requirement for any such limitation. For example, the device identifier app can be activated in a manner that is substantially different from the manner of activating the device fingerprint app.

As part of this operation, the device identifier app can cause the target device 100 to capture the challenge portion of the challenge/response, such as disposing its camera 111 to photograph the second device's display 162. As part of this operation, as further described herein, the target device's processor 120 can receive the challenge from its camera 111 for further processing by the target device's secure enclave 130.

At an operation 214, the target device's processor 120 can present the challenge to the target device's secure enclave 130 at the secure enclave's secure perimeter 133. The secure perimeter 133, coupled to the secure enclave's secure processor 132, can transmit the challenge to the secure processor and the secure memory 131. The secure processor 132 and the secure memory 131 can generate a fingerprint to be associated with the target device 100, in response to the challenge.

At an operation 215, the secure processor 130 can combine the seed 163 with a UID associated with the target device 100. The UID associated with the target device 100 can be maintained solely within the secure enclave 130, inaccessible from outside the secure perimeter 133. For example, the secure processor 130 can combine the seed 163 with the UID by any substantially secure technique, such as by generating a secure hash encoding of a combination of the seed 163 and the UID. The secure processor 130 can present a result of the combination as the response portion of the challenge/response. The response can be presented at the secure perimeter 133 to the processor 120.

As part of this operation, the target device's processor 120 can present the response portion of the challenge/response on the target device's display 112. As shown in FIG. 2, the response can be represented as a QR code on the target device's display 112. However, in the context of the embodiments, there is no particular requirement for any such limitation.

As part of this operation, the target device 100 can warn the responder or the initiator that the response portion is about to be presented, or can maintain the response portion available on the target device's display 112 for a sufficient duration that the second device 150 can be disposed to receive the response, or otherwise.

At an operation 216, the second device 150 can receive the response portion of the challenge/response, using the second device's camera 161. For example, after having received a warning, or during the duration while the response is presented, the initiator can dispose the second device 150 so as to direct its camera 161 toward the target device's display 112. The second device's camera 161 can receive the response portion of the challenge/response and couple it to the second device's processor 170 for further operation.

As part of this operation, the second device 150 can associate the challenge/response with the fingerprint record it associated with the target device 100. In one embodiment, the second device 150 can maintain one or more challenge/responses associated with the particular target device 100, so long as it identifies which challenge prompts the target device 100 to present which response.

At an operation 217, the second device 150 can maintain the challenge/response in the second device's memory 171, can maintain the challenge/response at another device, such as a remote database, or otherwise secure the challenge/response and its association with the target device 100 against alteration or deletion. For example, the second device 150 can maintain the challenge/response in a secure memory (such as a secure memory 131 similar to the target device 100), in an ordinary memory (such as an ordinary memory 171 in the second device 150), or in a remote memory (such as maintained on a remote cloud storage device, a remote database, or a remote virtual machine).

Countermeasures

The secure enclave 130 is disposed so that when penetrated, the challenge/response would no longer be the same. Once the target device's owner discovered the change in the challenge/response, the attacker would either have to (A) admit that it has physically attacked the secure enclave 130, and likely accessed the keys or passwords therein, or (B) attempt to reconstruct the target device 100 with a new secure enclave 130, possibly reconstructing the secure enclave 130 itself.

Because the secure enclave 130 requires substantial effort by an attacker to penetrate or reconstruct, an attacker who did not wish to admit that it has done so would likely follow course (B) described above, thus attempting to rebuild the target device 100, or a replica thereof, with a new secure enclave 130. The attacker would return the replica target device 100 to the owner and pretend that no attack had occurred.

Because, as further described herein, techniques described herein provide the target device's owner with methods of maintaining detailed records of the original challenge/response provided by the secure enclave 130. These detailed records can be maintained in multiple locations; this can have the effect that an attacker cannot easily obtain all copies of the detailed records, so as to alter or erase evidence of its attack on the target device 100.

For example, the target device's owner can maintain a copy of the challenge/response at one or more second devices, or copies of more than one such challenge/response at one or more second devices. The choice of which copies of which challenge/responses need not necessarily be the same for each such second device 150. Whenever the target device's owner suspects that an attacker may have breached the security of the secure enclave 130, the target device's owner can compare the target device's (possibly new) challenge/response(s) with its (earlier recorded) challenge/response(s), and determine whether there has been any change thereto. When the challenge/response has changed, the target device's owner has evidence that the target device's security has been breached.

As further described herein, should the second device 150 be unable to retrieve the response part of the challenge/response (such as if the remote database, remote server, or otherwise, is unavailable), the target device's owner can retrieve the response from a different second device 150. Alternatively, or should the user be unable to locate or retrieve the second device 150, such as if the attacker has seized the second device 150, or if the attacker has seized the second device's owner, or if the second device 150 is lost, or if the target device's owner is unable to locate the second device's owner, the target device's owner can retrieve the response from one or more instances of different second devices.

More generally, in one embodiment, the target device's owner can maintain the challenge/response on multiple second devices. This can have the effect that the target device's owner can locate a different second device 150 if the target device's owner's first choice of second device 150 is unavailable. This can have the effect that the target device's owner can compare the first challenge/response on multiple different second devices, when the target device's owner is not satisfied that comparison using the second device 150 is adequate.

For example, if the target device's owner suspects that the attacker has compromised a particular second device 150 (such as by replacing the challenge/response on that second device 150 with the challenge/response associated with the rebuilt target device 100), the target device's owner can test the target device 100 against the challenge/response record maintained on a different second device 150. Although it is possible that the attacker has found and compromised all of the second devices on which the target device's owner has recorded and maintained all of the challenge/response(s), the more such places where the target device's owner records and maintains the challenge/response(s), the more difficult it would be for the attacker to locate and compromise all such second devices and all such copies of the challenge/response(s). Accordingly, the target device's owner can be more confident that the target device 100 has not been compromised.

End of Part I

A flow point 200B indicates that the method 200 is ready to finish part I (recording the first challenge/response). The method 200 finishes operations and cleans up after any ongoing operations associated with part I.

For example, the target device 100 can de-allocate and possibly erase any buffer storage or terminated storage values, and can perform any terminating routines with respect to recording the challenge/response at the second device 150. In one embodiment, the second device 150 maintains a record of the challenge/response; there is no particular requirement for the target device 100 to further maintain a record of the challenge/response.

In one embodiment, the method 200 can be restarted as triggered by any technique described with respect to the flow point 200A.

The method can proceed with the next flow point.

Comparing Challenge/Response

Figure 4:
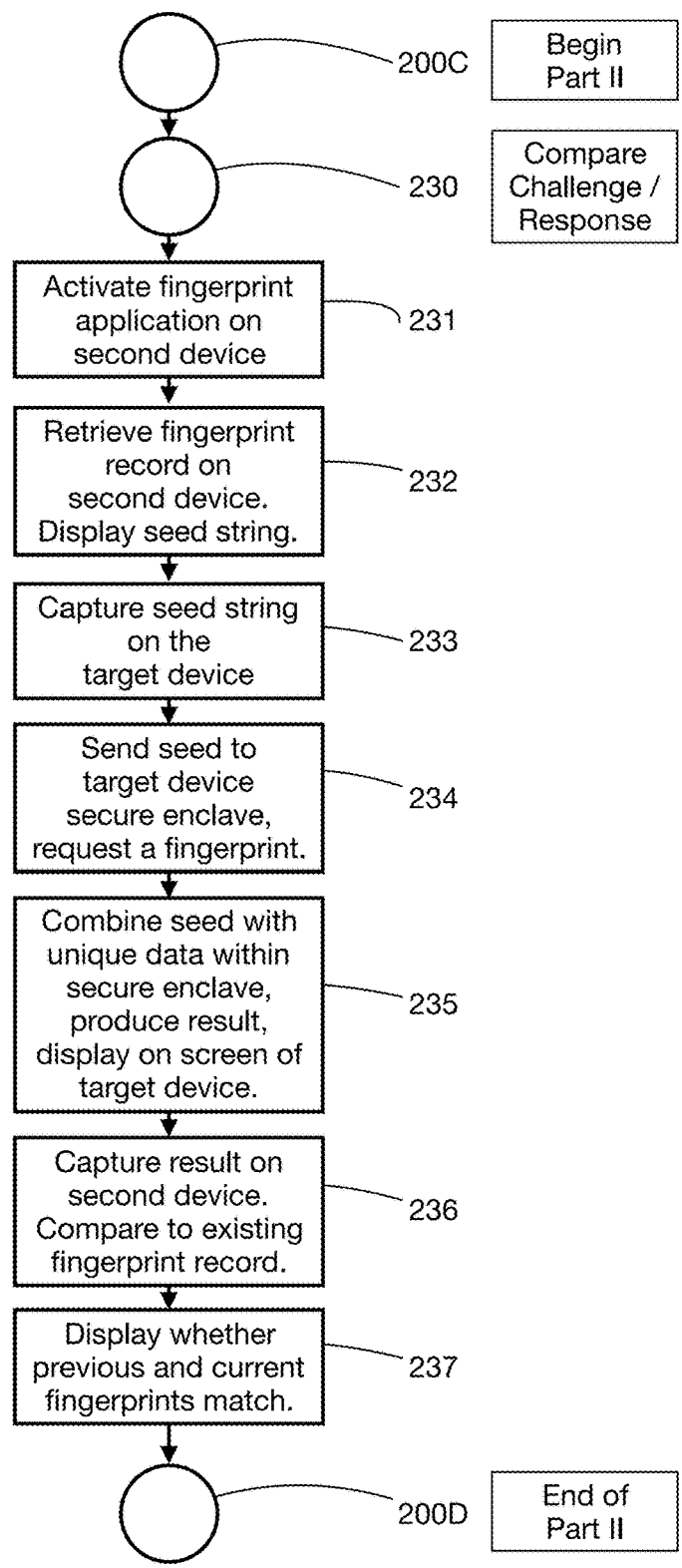
FIG. 4 shows a conceptual drawing of an example method of comparing the first challenge/response between the target device and the second device with a second challenge/response between the target device and the second device.

FIG. 4 shows a conceptual drawing of an example of the method 200 of comparing the first challenge/response between the target device 100 and the second device 150 with a second challenge/response between the target device 100 and the second device 150.

The method 200 also includes flow points and method operations as shown in FIG. 4, and as otherwise described herein, such as:

a flow point 200C, in which the method 200 is ready to begin part II (retrieving the second challenge/response);

a flow point 230, in which the method 200 is ready to retrieve a second challenge/response associated with the target device 100;

a flow point 200D, in which the method 200 is ready to finish part II retrieving the second challenge/response).

Beginning of Part II

A flow point 200C indicates that the method 200 is ready to begin part II (comparing the challenge/responses).

The flow point 200C can be triggered by one of more of the following:

an alert from the target device 100 or from the second device 150, such as when the target device 100 or the second device 150 is powered on or activated;

a selected location with respect to the target device 100 and the second device 150, or otherwise;

a user input from the target device 100 or the second device 150, such as when a selected function of the target device 100 is completed (such as selected sequence of key presses or a selected sequence of gestures on a smartphone touch-sensitive display);

a message from an external device, such as an SMS or MMS message, a Wi-Fi connection, a location device, or otherwise, or as otherwise described herein.

The method can proceed with the next flow point.

Comparing the Challenge/Responses

A flow point 230 indicates that the method 200 is ready to compare the challenge/responses associated with the target device 100.

At an operation 231, similar to the operation 211, the initiator of the challenge/response can activate a device fingerprint app on the second device 150. As part of this operation, the initiator enters an identification of the target device 100 for which the challenge/responses are to be compared. For example, the initiator can perform one or more of the following:

The initiator can enter the text "Steve's Phone";

The device fingerprint app can prompt the initiator to select one particular target device 100;

The initiator can photograph the target device 100 and the device fingerprint app can compare the photograph with an earlier photograph;

The device fingerprint app can request a UID from the target device 100, such as a phone number, IMEI, MAC address or IP address, or other device identifier, or otherwise, or as otherwise described herein.

At an operation 232, the device fingerprint app can cause the second device 150 to retrieve a memory entry associated with the target device 100, as identified in the just earlier operation (231). For example, the device fingerprint app can search a database of challenge/response entries for a key identifier associated with the target device 100.

As part of this operation, the device fingerprint app can retrieve the challenge portion of the stored challenge/response. The device fingerprint app can present the challenge portion to the target device 100. For example, the second device 150 can present the challenge on the second device's display 162 as a QR code.

At an operation 233, the target device 100 can receive the challenge portion of the challenge/response. For example, similar to the operation 213, the responder can trigger the device identification app on the target device 100. The target device's device identification app can prompt the responder to dispose the target device 100 so as to direct the target device's camera 111 at the second device's display 162. As part of this operation, as further described herein, the target device's processor 120 can receive the challenge from its camera 111 for further processing by the target device's secure enclave 130.

At an operation 234, similar to the operation 214, the target device's processor 120 can present the challenge to the target device's secure enclave 130 at the secure enclave's secure perimeter 133. The secure perimeter 133, coupled to the secure enclave's secure processor 132, can transmit the challenge to the secure processor 132 and the secure memory 131. The secure processor 132 and the secure memory 131 can generate a 'fingerprint' to be associated with the target device 100, in response to the challenge.

At an operation 235, similar to the operation 215, the target device's secure processor 130 can combine the fingerprint with a UID associated with the target device 100. As further described herein, the UID associated with the target device 100 can be maintained solely within the secure enclave 130, inaccessible from outside the secure perimeter 133. For example, the secure processor 130 can combine the fingerprint with the UID by any substantially secure technique, such as by generating a secure hash encoding of a combination of the fingerprint and the UID.

As part of this operation, the secure processor 130 can present a result of the combination as the response portion of the challenge/response. The response can be presented at the secure perimeter 133 to the processor 120. The target device's processor 120 can present the response portion of the challenge/response on the target device's display 112.

As part of this operation, the target device 100 can warn the responder or the initiator that the response portion is about to be presented, or can maintain the response portion available on the target device's display 112 for a sufficient duration that the second device 150 can be disposed to receive the response, or otherwise.

At an operation 236, similar to the operation 216, the second device 150 can receive the response portion of the challenge/response, using the second device's camera 161. The second device's camera 161 can receive the response portion of the challenge/response and couple it to the second device's processor 170 for further operation.

As part of this operation, the second device 150 can retrieve the one or more challenge/responses it has associated with the target device 100 from where it maintains those challenge/responses. As further described herein, those challenge/responses can be maintained in a secure memory, in an ordinary memory, or in a remote memory. The remote memory can include a remote cloud storage device, a remote database, or a remote virtual machine.

As part of this operation, the second device 150 can retrieve the one or more challenge/responses it has associated with the target device 100 from more than one such storage location. In such cases, the second device 150 can retrieve more than one copy of those stored challenge/responses. By comparing those stored challenge/responses, the second device 150 can determine whether any (or all) of them have been altered or otherwise themselves compromised.

As part of this operation, the second device 150 can compare the current challenge/response with the retrieved earlier challenge/response it associated with the target device 100. As further described herein, there can be one or more challenge/responses that the second device 150 maintains associated with the target device 100. For example, the second device 150 can have recorded the target device's response to more than one such challenge, thus providing more than one challenge/response to associated with the target device 100 (so long as the second device 150 identifies which challenge prompts the target device 100 to present which response). Alternatively, the second device 150 can present more than one challenge to the target device 100 and can obtain more than one challenge/response, so as to compare each pair of the multiple challenge/responses.

Accordingly, when the challenge/response matches at least one challenge/response associated with the target device 100, the second device 150 can determine that the target device 100 has not been compromised by an attacker. When the challenge/response cannot match any challenge/response associated with the target device 100, the second device 150 cannot assure that the target device 100 has not been compromised by an attacker.

At an operation 237, the second device 150 can present whether it was able to find a matching challenge/response, to the initiator or the responder, or to another person. For example, the second device 150 can provide a graphic or text indicating "match" or "no match" on its display 162. Alternatively, the second device 150 can present the results of attempting to match the current challenge/response with earlier challenge/responses in another mode, such as an audio response or otherwise.

End of Part II

A flow point 200D indicates that the method 200 is ready to finish part II (comparing the challenge/responses). The method 200 finishes operations and cleans up after any ongoing operations associated with part II.

For example, the target device 100 can de-allocate and possibly erase any buffer storage or terminated storage values, and can perform any terminating routines with respect to recording the challenge/response at the second device 150. In one embodiment, the second device 150 maintains a record of the challenge/response; there is no particular requirement for the target device 100 to further maintain a record of the challenge/response.

In one embodiment, the method 200 can be restarted as triggered by any technique described with respect to the flow point 200A.

Challenge/Response Devices

Figure 5:
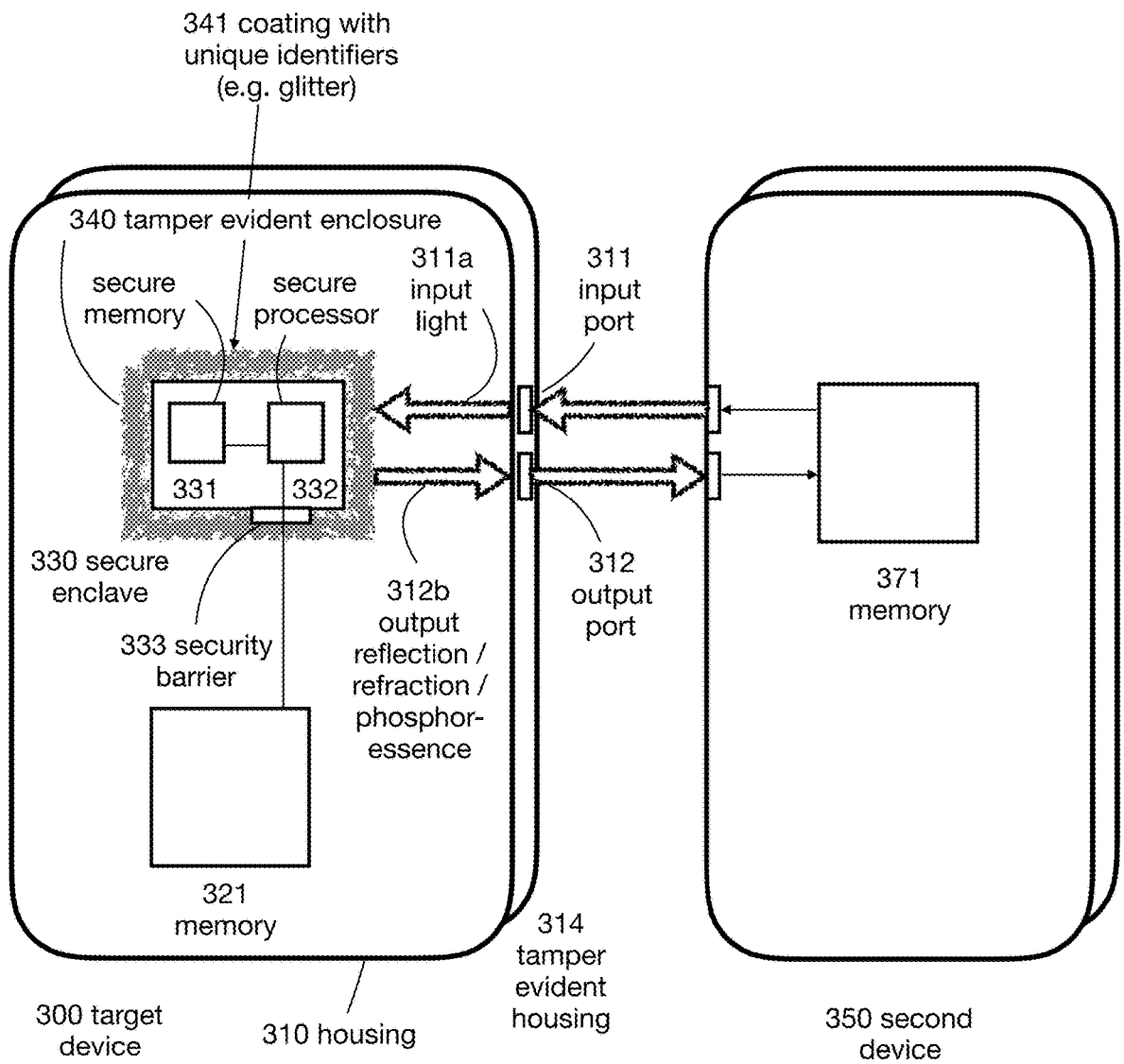
FIG. 5 shows a conceptual drawing of an example security challenge/response between a second device and a target device.

FIG. 5 shows a conceptual drawing of an example security challenge/response between a second device and a target device.

As further described herein, a target device 300 includes a secure tamper evident enclosure, and is described herein as possibly subject to a security attack. A second device 350 includes another device external to the target device 300 capable of performing the functions described herein. The target device 300 and the second device 350 can collectively provide an additional measure of security with respect to the target device 300.

As further described herein, a target device 300 is described with respect to elements as shown in the figure, and as otherwise described herein, such as:

a housing 310, such as further described herein, possibly including one or more input ports 311, and output ports 312;

a memory 321, such as further described herein, possibly including one or more physical elements such as RAM (random access memory), SSD (solid state devices), or other types of storage;

a secure enclave 330, such as further described herein, possibly including one or more physical elements such as a secure memory 331 (as further described herein), a processor 332, and a security barrier 333;

a tamper evident enclosure 340, such as further described herein, possibly including one or more physical elements such as a gel or plastic coating 341, embedded with one or more unique identifiers in the form of physical elements such as reflective or phosphorescent bits;

other elements, as further described herein, for possible use to perform functions described herein, or otherwise, or as otherwise described herein.

System Elements

As further described herein, the target device 300 can be used in conjunction with the second device 350, such as another similar device or a device having similar functions. The second device 350 can be used to perform a challenge/response function, such as by generating a challenge input, disposing the challenge input to the target device 300, receiving a response output from the target device 300, and maintaining the challenge/response information in a memory accessible by the second device 350. The second device 350 can also be used to compare the response from the target device 300 with an earlier response, from an earlier challenge/response function, and to notify the second device's user whether the response is different from the earlier response. The second device 350 can also send a message to the target device 310, which can notify the target device's owner, or the second device's owner can notify the target device's owner, whether the response is different from the earlier response.

Target Device Housing

The housing 310 can include a relatively secure case in which the elements of the target device 300 are maintained, such as a durable plastic (substantially flexible or otherwise) generally disposed to remain unopened except for repairs or disassembly. The durable plastic can include polypropylene, thermoplastic polyurethane, or other materials having substantially similar capabilities. Alternatively, the housing 310 can include a castaluminum or other metal, a machined or milled aluminum or other metal, an electroplated material, or otherwise.

The housing 310 can include one or more input ports 311, such as a camera, an image sensor or other video input, a microphone or other audio input, a USB (universal serial bus) or other electromagnetic input, a power charging port, an internal lighting or other challenge input 311a, or otherwise. The housing 310 can include one or more output ports 312, such as the same or another camera, such as a speaker, a USB or other electromagnetic output, a power charging port, the internal lighting or other challenge input 311a or an associated output 312b, or otherwise.

Challenge/Response

While normally the internal elements of the target device 300 may operate without lighting, the internal lighting or other challenge input 311a, or another input port 311, can receive a lighting signal from the second device 350 (such as from an output port 312b at the second device 350) as a challenge portion of the challenge/response. At least a portion of the challenge can provide a lighting signal from the second device 350; alternatively, the challenge can include an electromagnetic signal from the second device 350. The lighting signal can reach the tamper evident enclosure 340 and its coating 341, prompting the coating 341 to provide one or more responses as a response portion of the challenge/response (such as provided to an input port 311a at the second device 350). The responses can include reflections, refractions, phosphorescence, or other lighting responses from elements embedded in or otherwise coupled to the coating 341; alternatively, the responses can include electromagnetic signals provide to the second device 350. The reflections, refractions, or phosphorescence included in the responses (or alternatively, the electromagnetic signals included in the responses) can be output using the challenge input 311a or an associated output 312b, or using another output port 312, or otherwise.

As further described herein, the challenge/response provided to/from the tamper evident enclosure and its coating 341 can effectively provide a "one-way function", similar to a hash function, or similar to how encryption looks to those who do not have the key. (While an attacker can in fact obtain the "key" by examining the tamper evident enclosure 340 and its coating 341, the attacker cannot both pierce the tamper evident enclosure 340 and provide the user with a duplicate thereof after reassembly of the target device 300.) Each individual coating 341 can provide a substantially unique one-way function, which, as further described herein, can be examined but not easily duplicated by an attacker. Using the challenge/response provided by the coating 341, the owner of the target device 300 can determine whether the coating 341, and thus, the one-way function, and thus, the tamper evident enclosure 340, has been altered or otherwise compromised. The coating 341, and thus, the one-way function, is necessarily altered whenever an attacker alters the tamper evident enclosure 340.

As further described herein, the target device 300 can be used in conjunction with a second device 350, such as a device having similar functions. The second device 350 can be used to perform a challenge/response function, such as by generating a challenge input, disposing the challenge input to the target device 300, receiving a response output from the target device 300, and maintaining the challenge/response information in a memory accessible by the second device 350. The second device 350 can also be used to compare the response from the target device 300 with an earlier response, from an earlier challenge/response function, and to notify the target device's user whether the response is different from the earlier response.

As further described herein, the reflective, refractive, or phosphorescent elements can have one or more time delays to their response, or time-varying aspects to their response. For example, a phosphorescent element can increase/decrease in phosphorescence with respect to time. This can have the effect that the response portion of the challenge/response can have a time-delayed and/or time-varying effect even when the challenge portion of the challenge/response is substantially instantaneous. This can also have the effect that the response portion of the challenge/response can have an unexpected or nonlinear time-delayed and/or time-varying effect even when the challenge portion of the challenge/response is substantially well-defined.

This can have the effect that although an attacker with physical possession of the target device 300 can physically remove the tamper evident enclosure 340 and its coating 341, and thereby obtain the keys or passwords in the secure enclave 330, doing so would damage the tamper evident enclosure 340 and its coating 341. The tamper evident enclosure 340 is described as "tamper evident" and not "tamper proof" because it is generally possible for an attacker with physical possession of the target device 300 to remove (thus, tamper with) the tamper evident enclosure 340, but having done so, the attacker's actions would have the effect of providing evidence of the tampering.

Alternatively, the target device's owner can further protect against physical attacks by coupling the housing 310 itself to another tamper evident housing 314, such as by coating the housing 310 in glitter nail polish or some similar material. While this technique can provide some additional protection against tampering with the target device 300, an external tamper evident housing 314, such as glitter nail polish or some similar material, is subject to scratches and other damage, which may render it unsuitable as evidence of an attack on the target device's secure data.

Protected Data

Data that is maintained secure in the memory 321 can be encrypted using one or more keys or passwords. The keys or passwords can be maintained in the secure enclave 330, such as in the secure memory 331, and only accessible upon approval by the processor 332 upon a request made at the security barrier 333. The secure enclave 330, including the memory 331, processor 332, and security barrier 333, is maintained against access by the tamper evident enclosure 340.

As further described herein, the tamper evident enclosure 340 can include a material that cannot be easily removed without providing evidence thereof, such as a gel or plastic coating, or a combination thereof. The tamper evident enclosure 340 can also include one or more patterns of material that are very difficult to duplicate, or at least for which the work involved in duplication is well above the value of breaching the security of the target device 300. For example, the tamper evident enclosure 340 can include a coating 341 including a substantially random pattern of reflective or phosphorescent materials, such as glitter, dispersed in the tamper evident enclosure 340, or in a plastic or gel coating thereof. Although an attacker can remove the tamper evident enclosure 340 and obtain the keys or passwords in the secure enclave 330, doing so would damage the tamper evident enclosure 340.

Once the tamper evident enclosure 340 is damaged, the attacker would either have to (A) admit that it has physically attacked the secure enclave 330, and likely accessed the keys or passwords therein, or (B) attempt to reconstruct the tamper evident enclosure 340 around the secure enclave 330, and possibly reconstruct the secure enclave 330 itself.

Countermeasures

Because reconstruction of the tamper evident enclosure 340 around the secure enclave 330 is, as further described herein, deliberately very difficult, an attacker who did not wish to admit that it has physically attacked the secure enclave 330 would likely follow course (B) described above, thus attempting to reconstruct the tamper evident enclosure 340 around the secure enclave 330, and possibly reconstructing the secure enclave 330 itself. The attacker would also likely reconstruct the target device 300 itself, or a replica thereof, and return the replica target device 300 to the owner. The attacker would then return the reconstructed target device 300 to the owner and pretend that no attack had occurred.

As further described herein, the target device's owner may not normally attempt to view the tamper evident enclosure 340, or otherwise attempt to determine whether the challenge/response of the target device 300 is unaltered, as the tamper evident enclosure 340 and its coating 341 would normally be maintained in darkness within the target device's housing 310. However, as further described herein, techniques described herein provide the target device's owner with methods of maintaining detailed records of the original challenge/response provided by the tamper evident enclosure 340 and its coating 341. Moreover, these detailed records can be maintained in multiple locations; this can have the effect that an attacker cannot obtain all copies of the detailed records, so as to alter or erase evidence of its attack on the target device 300.

As further described herein, the target device's owner can maintain a copy of the challenge/response at one or more second devices 350, such as other devices similar to the target device 300 or other devices having similar capabilities. Whenever the target device's owner suspects that an attacker may have physically breached the security of the target device 300, the target device's owner can compare the target device's (possibly new) challenge/response with its (earlier recorded) challenge/response, and determine whether there has been any change thereto. When the challenge/response has changed, the target device's owner has evidence that the target device's security has been breached.

Challenge/Response Methods

Figure 6:
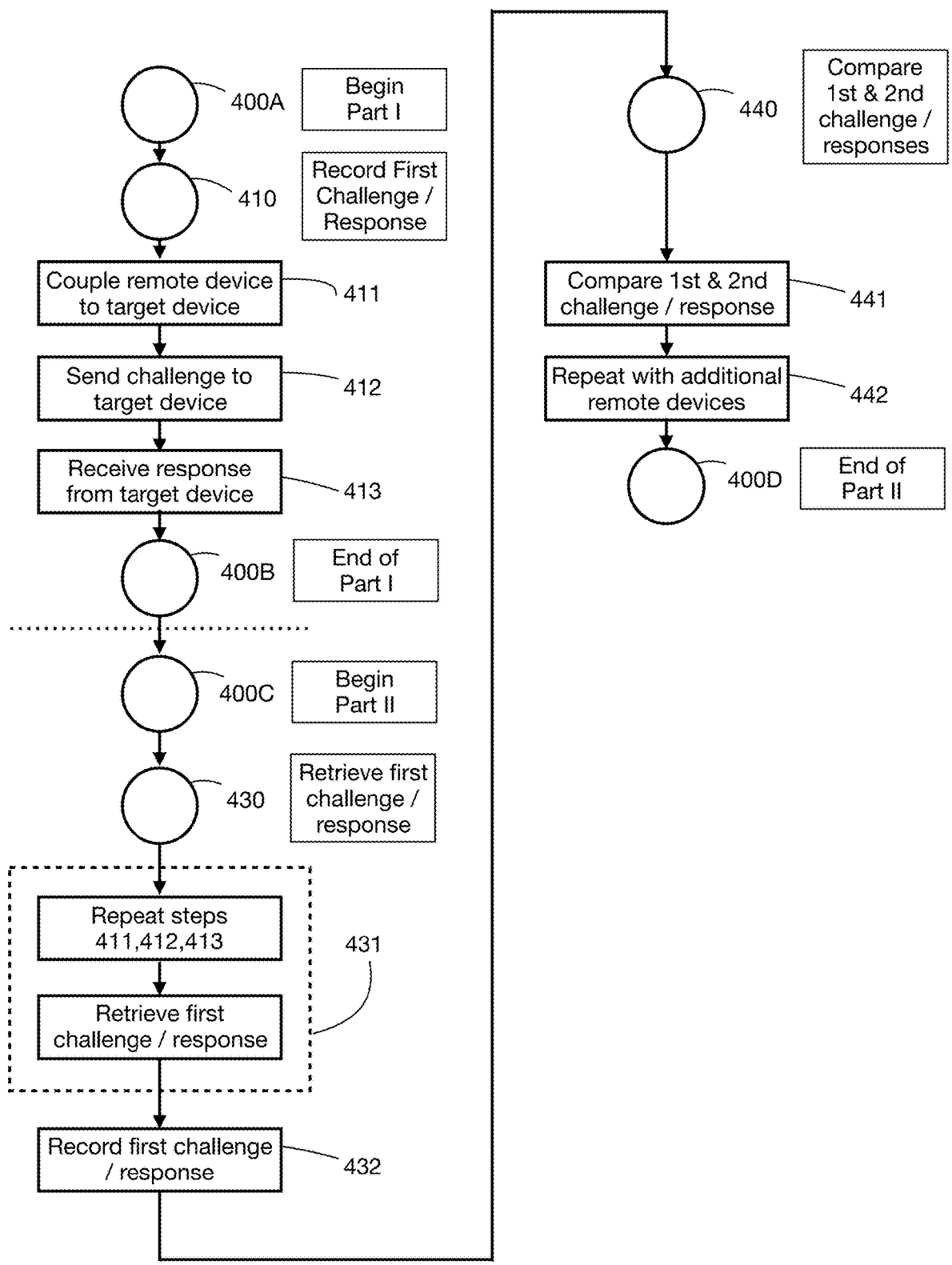
FIG. 6 shows a conceptual drawing of an example method of using the second and target devices to compare challenge/responses with a secure tamper evident enclosure.

FIG. 6 shows a conceptual drawing of an example method of using the second and target devices to compare challenge/responses with a secure tamper evident enclosure.

A method 400 includes flow points and method operations as shown in the figure, and as otherwise described herein, such as:

a flow point 400A, in which the method 400 is ready to begin part I (recording the first challenge/response);

a flow point 410, in which the method 400 is ready to record a first challenge/response associated with the target device 300;

a flow point 400B, in which the method 400 is ready to finish part I (recording the first challenge/response);

a flow point 400C, in which the method 400 is ready to begin part II (retrieving the second challenge/response);

a flow point 430, in which the method 400 is ready to retrieve a second challenge/response associated with the target device 300;

a flow point 440, in which the method 400 is ready to compare the first challenge/response with the second challenge/response;

a flow point 400D, in which the method 400 is ready to finish part II retrieving the second challenge/response).

Beginning of Part I

A flow point 400A indicates that the method 400 is ready to begin part I (recording the challenge/response).

The method 400 can be triggered by one of more of the following:

an alert from the target device 300 or from the second device 350, such as when the target device 300 or the second device 350 is powered on, activated;

a selected location of the target device 300 and the second device 350, or otherwise;

a user input from the target device 300 or the second device 350, such as when a selected function of either the target device 300 or the second device 350 is completed (such as selected sequence of key presses or a selected sequence of gestures on a smartphone capacitive display);

a message from an external device, such as an SMS or MMS message, a Wi-Fi connection, a location device, or otherwise;

or as otherwise described herein.

The method can proceed with the next flow point.

Recording the First Challenge/Response

A flow point 410 indicates that the method 400 is ready to record a first challenge/response associated with the target device 300.

At an operation 411, the owner of the target device 300, or the owner of the second device 350, or another person, can dispose the second device 350 so as to couple an output port 312b of the second device 350 to an input port 311a of the target device 300. This can have the effect that the second device 350 can provide a challenge portion of the challenge/response to the target device 300.

For example, the challenge/response associated with the target device 300 can include a challenge portion including input light, and a response portion including a set of output reflections, refractions, or phosphorescence (such as provided by the tamper evident enclosure 340 or its coating 341). In such cases, the second device 350 can be disposed so as to provide input light to the target device 300, and to receive output light from the target device 300. Although this Application primarily describes the second device 350 as providing a (possibly unique or time-sensitive) challenge, such as a sequence of light that is particular to the second device 350, in the context of the embodiments, there is no particular requirement for any such limitation. For example, the challenge can simply be an ordinary light (possibly at a selected frequency). Because the tamper evident enclosure 340 and its coating 341 are very difficult to duplicate, this can have the effect that the response portion of the challenge/response is unique to the tamper evident enclosure 340 and its coating 341 even when the challenge portion of the challenge/response is well known.

In one embodiment, the input light can be provided at one or more input ports 311, such as an input port 311a associated with the challenge part of the challenge/response, or such as another other input port 311 (such as a camera or an image sensor, a camera sighting element, another input lighting element, or otherwise) of the target device 300. For example, the one or more input ports 311 can include one or more video input devices, such as one or more still cameras, motion-picture cameras, or variants thereof, or otherwise.

Although this Application primarily describes the challenge part of the challenge/response as including a sequence of light input to the target device 300, in the context of the embodiments, there is no particular requirement for any such limitation. For example, the challenge part of the challenge/response can include an electromagnetic signal. The electromagnetic signal can be coupled to an input port 311, such as an input signal 311a associated with the challenge part of the challenge/response, or such as another other input port 311. For example, the one or more input ports 311 can include one or more electromagnetic input devices, such as one or more elements for operation of telephone communication, Wi-Fi communication, NFC (near field communication), RFID (radio frequency ID), SMS or MMS or other text messaging protocol, or variants thereof, or otherwise.

Although this Application primarily describes the second device 350 as including another device of the same or similar type, or of another type, such as (when the target device 300 includes a smartphone) another smartphone; in the context of the embodiments, there is no particular requirement for any such limitation. For example, the second device 350 can include a completely different device, such as a device having properties suitable for performing the functions as further described herein.

At an operation 412, the second device 350 provides the challenge portion of the challenge/response to the target device 300. As further described herein, the challenge part of the challenge/response can illuminate an inside part of the target device 300, with the effect that the tamper evident enclosure 340 and its coating 341 are illuminated. The tamper evident enclosure 340 and its coating 341 can provide a sequence of reflections, refractions, and phosphoresces, in response thereto. The sequence of reflections, refractions, and phosphoresces can be provided by the target device 300 as the response portion of the challenge/response. The target device 300 can provide the response portion of the challenge/response to the second device 350.

In one embodiment, the output light (the sequence of reflections, refractions, and phosphoresces) can be provided at one or more output ports 312, such as an output port 312b associated with the challenge part of the challenge/response, or such as another output port 312 (such as a camera lens, a camera sighting element, another input lighting element, or otherwise) of the target device 300. The output light can be coupled from the selected output ports 312 of the target device 300 to an input port 311 of the second device 350.

In one embodiment, the one or more output ports 312, can include one or more video output devices, such as one or more screens capable of presenting text, still pictures, motion pictures, holograms, AR (augmented reality) images, VR (virtual reality) images, or otherwise. Similarly, when the one or more output ports 312 are disposed to output electromagnetic signals, the one or more output ports 312 can include one or more electromagnetic output devices, such as one or more elements for operation of communication techniques described herein, or variants thereof, or otherwise.

At an operation 413, the second device 350 can receive the "response" part of the challenge/response, and can maintain both the challenge part and the response part of the challenge/response in memory 371. For example, the second device 350 can maintain the challenge/response in a secure memory (such as a secure memory 331 similar to the target device 300), or an ordinary memory (such as a memory 520 similar to the target device 300), or a remote memory (such as maintained on a remote cloud storage device, a remote database, or a remote virtual machine).

Because, as further described herein, the challenge/response is maintained to show whether the tamper evident enclosure 340 or its coating 341 have been altered, and because the tamper evident enclosure 340 and its coating 341 effectively provide a one-way function from the challenge part to the response part of the challenge/response, there is no particular requirement that the challenge/response is maintained in a secure memory. For example, the second device's owner can maintain the challenge/response in multiple relatively insecure memories. This can have the effect that the second device's owner can retrieve the original challenge/response, even if one or more of those insecure memories is compromised, or even if one or more of those insecure memories is under control of the attacker.

The method can proceed with the next flow point.

End of Part I

A flow point 400B indicates that the method 400 is ready to finish part I (recording the first challenge/response). The method 400 finishes operations and cleans up after any ongoing operations associated with part I.

For example, the target device 300 can de-allocate and possibly erase any buffer storage or terminated storage values, and can perform any terminating routines with respect to recording the challenge/response at the second device 350. In one embodiment, the second device 350 maintains a record of the challenge/response; there is no particular requirement for the target device 300 to further maintain a record of the challenge/response.

In one embodiment, the method 400 can be restarted as triggered by any technique described with respect to the flow point 400A.

The method can proceed with the next flow point.

Beginning of Part II

A flow point 400C indicates that the method 400 is ready to begin part II (retrieving the second challenge/response).

The method 400 can be triggered by one of more of the following:
- an alert from the target device 300 or from the second device 350, such as when the target device 300 or the second device 350 is powered on, activated;
- a selected location of the target device 300 and the second device 350, or otherwise;
- a user input from the target device 300 or the second device 350, such as when a selected function of either the target device 300 or the second device 350 is completed (such as selected sequence of key presses or a selected sequence of gestures on a smartphone capacitive display);
- a message from an external device, such as an SMS or MMS message, a Wi-Fi connection, a location device, or otherwise, or as otherwise described herein.

The method can proceed with the next flow point.

Retrieving the Second Challenge/Response

A flow point 430 indicates that the method 400 is ready to retrieve a second challenge/response associated with the target device 300.

At an operation 431, the second device 350 can retrieve the response part of the challenge/response from the first challenge/response associated with the target device 300. For example, the second device 350 can retrieve the response from a memory, a secure memory, a remote database, a remote server, or otherwise. As further described herein, it is not required, but it is preferable for the second device 350 to maintain the challenge/response in a secure memory, or to maintain the challenge/response in a remote location and encrypted with a key or password maintained in a secure memory.

As part of this operation, the target device 300 and the second device 350 can perform the operations 431 with respect to the flow point 410 (that is, can repeat the operations 411, 412, and 413). This can have the effect that the second device 350 can retrieve the response part of the challenge/response from the target device 300, similarly to the flow point 410.

Should the second device 350 be unable to retrieve the response part of the challenge/response (such as if the remote database, remote server, or otherwise, is unavailable), the target device's owner can retrieve the response from a different second device 350. Alternatively, or should the user be unable to locate or retrieve the second device 350, such as if the attacker has seized the second device 350, or if the attacker has seized the second device's owner, or if the second device 350 is lost, or if the target device's owner is unable to locate the second device's owner, the target device's owner can retrieve the response from a different second device 350.

More generally, in one embodiment, the target device's owner can maintain the challenge/response on multiple second devices 350. This can have the effect that the target device's owner can locate a different second device 350 if the target device's owner's first choice of second device 350 is unavailable. This can have the effect that the target device's owner can compare the first challenge/response on multiple different second devices 350, when the target device's owner is not satisfied that comparison using the second device 350 is adequate.

For example, if the target device's owner suspects that the attacker has compromised a particular second device 350 (such as by replacing the challenge/response on that second device 350 with the challenge/response associated with the rebuilt target device 300), the target device's owner can test the target device 300 against the challenge/response record maintained on a different second device 350. Although it is possible that the attacker has found and compromised all of the second devices 350 on which the target device's owner has recorded and maintained the challenge/response, the more such places where the target device's owner records and maintains the challenge/response, the more difficult it would be for the attacker to locate and compromise all such second devices 350 and all such copies of the challenge/response. Accordingly, the target device's owner can be more confident that the target device 300 has not been compromised.

At an operation 432, the second device 350 can maintain the challenge/response, particularly the response part of the challenge/response from the target device 300, such as in a memory 371 (similar to the memory 321 associated with the target device 300, as further described herein with respect to the flow point 410).

The method can proceed with the next flow point.

Comparing the Responses

A flow point 440 indicates that the method 400 is ready to compare the first challenge/response with the second challenge/response.

At an operation 441, the second device 350 (or alternatively, the target device 300) compares the first challenge/response with the second challenge/response. In one embodiment, the challenge part of the challenge/response would be the same for both the first challenge/response and the second challenge/response, so the comparison would be performed with respect to the response part of the first challenge/response and the second challenge/response.

As part of this operation, the second device 350 determines whether the first response is substantially identical to the second response. In one embodiment, the first response and the second response can be required to be strictly identical. When the first response is identical to the second response, whether substantially identical or strictly identical, the target device's owner can be relatively confident that the target device 300 has not been compromised. In this context, the target device 300 being "compromised" generally means that an attacker has breached the tamper evident enclosure 340 and has possibly obtained the keys or passwords in the secure memory 331.

At an operation 442, as further described herein, the target device's owner can repeat the operations associated with the flow point 430 and this flow point 440, with respect to a different second device 350, to assure that the selected second device 350 was not itself compromised by the attacker and its challenge/response records replaced with new challenge/response records associated with a rebuilt target device 300. As further described herein, when the target device's owner compares the challenge/response with additional challenge/responses maintained on additional second devices 350, the target device's owner can be more confident that the attacker has not compromised all such second devices 350.

As part of this operation, when the target device's owner finds that the challenge/response values match for some second devices 350 but not others, the target device's owner can be reasonably suspect that the attacker has compromised the target device 300.

The method can proceed with the next flow point.

End of Part II

A flow point 400D indicates that the method 400 is ready to finish part II (retrieving the first challenge/response). The method 400 finishes operations and cleans up after any ongoing operations associated with part II.

For example, the second device 350 can de-allocate and possibly erase any buffer storage or terminated storage values, and can perform any terminating routines with respect to recording the challenge/response at the second device 350. In one embodiment, the target device's owner can maintain a record of the comparison of the first challenge/response with the second challenge/response, such as on the target device 300, the second device 350, or otherwise. However, in the context of the embodiments, there is no particular requirement for any one particular device to further maintain a record of the challenge/response, so long as the record is maintained at least somewhere.

In one embodiment, the method 400 can be restarted as triggered by any technique described with respect to the flow point 400A.

Alternative Embodiments

Although this Application primarily describes one set of preferred techniques for informing the owner whenever any invalid access to their target device has occurred, in the context of the embodiments, there is no particular requirement for any such limitation. Other or similar techniques for informing the owner of invalid access would also be workable, and are within the scope and spirit of this description. After reading this Application, those skilled in the art would be able to incorporate such other techniques with the techniques shown herein.

In some embodiments, a fingerprint is generated by a target device (such as target device 100 or 300) using a secure enclave processor based at least in part on a secure one-way hash of a unique identifier of the target device (such as a random or a pseudo-random number) and predefined information, e.g., a QR code, an image, a number, etc. For example, the secure enclave processor may generate the unique identifier when the target device is turned on or unlocked. Moreover, the unique identifier may be changed in the event that there is unauthorized access to secure data stored in memory in a secure enclave in the target device or other un-authorized access.

The fingerprint may be provided by the target device to a remote electronic device (such as cloud-based server or computer) that stores the fingerprint. For example, the fingerprint may be provided to the remote electronic device via wired or wireless communication. In some embodiments, the fingerprint is provided to the remote electronic device along with a timestamp. This timestamp may be used to determine whether the fingerprint is valid (such as whether a predefined amount of time has elapsed). Note that the fingerprint provided to the remote electronic device may be encrypted using an encryption key that is only known to the target device.

Subsequently, the fingerprint may be provided to the target device by the remote electronic device. For example, in response to a security request received from a user of the target device (such as via a user interface) or when a predefined time interval (such as a day, a week, etc.) has elapsed, the target device may request and then may receive the fingerprint (or information that specifies the fingerprint) from the remote electronic device. Next, a comparison may be made by the target device (such as using the secure enclave processor) between the fingerprint and a new instance of the fingerprint that is generated by the secure enclave processor using the current unique identifier and the predefined information. If the unique identifier has changed, the fingerprint and the new fingerprint will not match, and a user will be alerted that there has been un-authorized access to data on the target device. In embodiments where the fingerprint received from the remote electronic device is encrypted, the target device may decrypt the fingerprint before the comparison is performed.

Moreover, in some embodiments, instead of the electronic device performing the comparison, the second electronic device may perform the comparison. Based on the results, the second electronic device may perform the remedial action (such as alerting a user that secure data on the electronic device has been compromised) or may provide information to the electronic device so the electronic device can perform the remedial action. Furthermore, in some embodiments, the fingerprint communicated between the electronic device to the second electronic device may not be encrypted.

Furthermore, in some embodiments, a user of the second electronic device user may launch a 'fingerprint' app and may create a new record in an associated data structure, e.g., by capturing a unique identifier from the electronic device, or by entering a title for the new record (such as 'Steve's Phone'). Then, the second electronic device may create a random seed, number or image, and may store the random seed with or associated with the new record, and may display or provide the random seed, number or image to the electronic device.

Subsequently, the electronic device may capture the random seed, number or image, the may provide it to a secure enclave in the electronic device. The secure enclave processor in the secure enclave may combine the random seed, number or image with the unique identifier. In some embodiments, the secure enclave processor may process this combination, e.g., with a hash. Next, the electronic device may display or provide the result (such as the combination or a hashed combination) to the second electronic device.

The second electronic device may capture the response and stores it with the new record.

Furthermore, when a user or owner of the electronic device is concerned or wants to check whether the electronic device has been compromised, they can ask a user of the second electronic device to challenge them with the same seed. The electronic device may perform the same calculation and may provide or display the result to the second electronic device. Next, the second electronic device may compare the newly calculated result with the previously stored result and may inform the user of the electronic device user that their unique identifier is the same or has been altered (such as following an unauthorized access to secure data in the electronic device).

Figure 7:
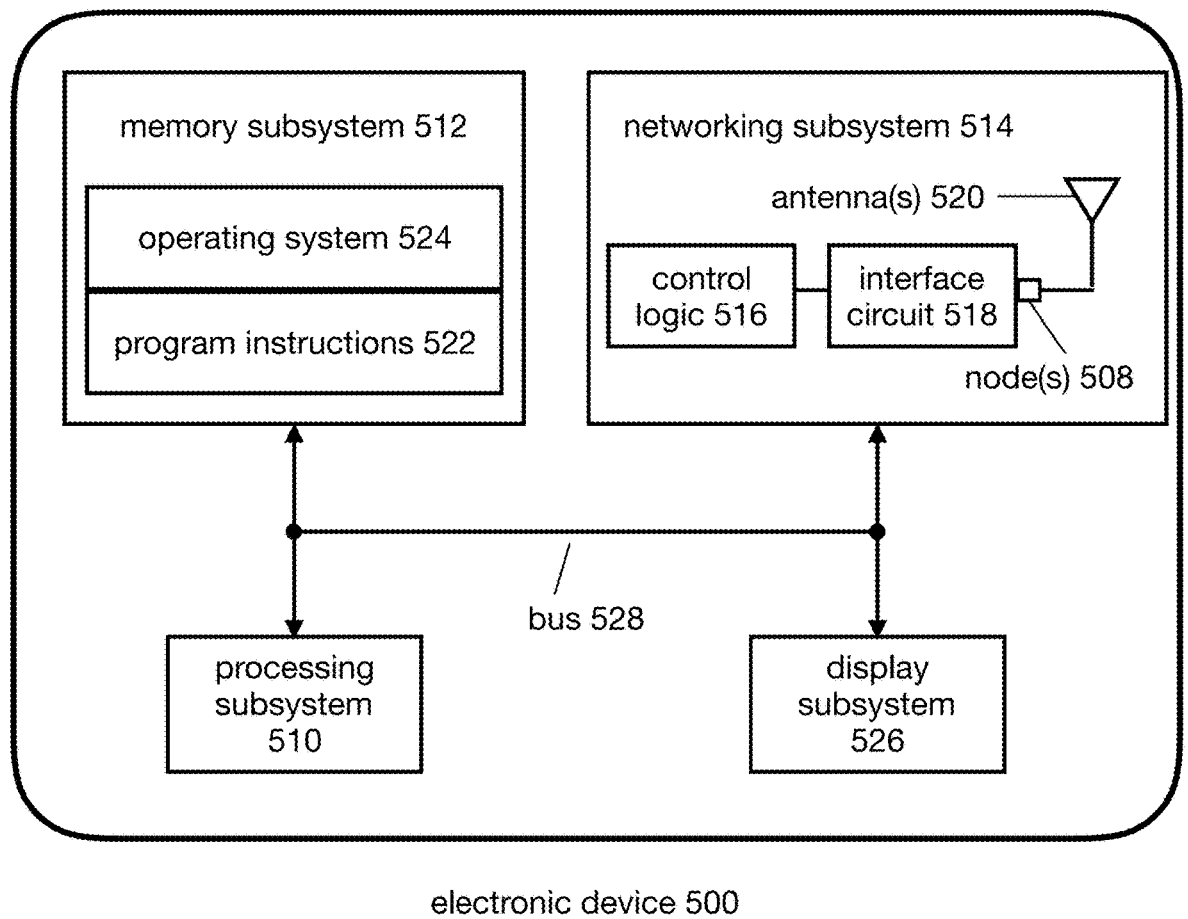
FIG. 7 shows a conceptual drawing of an example of electronic device.

FIG. 7 presents a block diagram illustrating an example of an electronic device 500 in accordance with some embodiments, such as one of the target device 100, the second device 150, the target device 300 or the second device 350.

This electronic device may include a processing subsystem 510, a memory subsystem 512, and a networking subsystem 514. The processing subsystem 510 may include one or more devices configured to perform computational operations. For example, the processing subsystem 510 can include one or more microprocessors, ASICs, microcontrollers, programmable-logic devices, one or more graphics process units (GPUs) and/or one or more digital signal processors (DSPs).

The memory subsystem 512 may include one or more devices for storing data and/or instructions for the processing subsystem 510 and the networking subsystem 514. For example, the memory subsystem 512 can include dynamic random access memory (DRAM), static random access memory (SRAM), and/or other types of memory. In some embodiments, instructions for the processing subsystem 510 in the memory subsystem 512 include: one or more program modules or sets of instructions (such as program instructions 522 or an operating system 524), which may be executed by the processing subsystem 510. Note that the one or more computer programs may constitute a computer-program mechanism. Moreover, instructions in the various modules in the memory subsystem 512 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by the processing subsystem 510.

In addition, the memory subsystem 512 can include mechanisms for controlling access to the memory. In some embodiments, the memory subsystem 512 includes a memory hierarchy that comprises one or more caches coupled to a memory in the electronic device 500. In some of these embodiments, one or more of the caches is located in the processing sub system 510.

In some embodiments, the memory subsystem 512 is coupled to one or more highcapacity mass-storage devices (not shown). For example, the memory subsystem 512 can be coupled to a magnetic or optical drive, a solid-state drive, or another type of mass-storage device. In these embodiments, the memory subsystem 512 can be used by the electronic device 500 as fast-access storage for often-used data, while the mass-storage device is used to store less frequently used data.

The networking subsystem 514 may include one or more devices configured to couple to and communicate on a wired and/or wireless network (i.e., to perform network operations), including: a control logic 516, an interface circuit 518 and one or more antennas 520 (or antenna elements). (While FIG. 7 includes the one or more antennas 520, in some embodiments the electronic device 500 includes one or more nodes, such as a nodes 508, e.g., a network node that can be connected or coupled to a network, or a pad that can be coupled to the one or more antennas 520. Thus, the electronic device 500 may or may not include the one or more antennas 520.) For example, the networking subsystem 514 can include a Bluetooth™ networking system, a cellular networking system (e.g., a 3G/4G network such as UMTS, LTE, etc.), a universal serial bus (USB) networking system, a networking system based on the standards described in IEEE 802.11 (e.g., a Wi-Fi® networking system), an Ethernet networking system, and/or another networking system.

The networking subsystem 514 may include processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, the electronic device 500 may use the mechanisms in the networking subsystem 514 for performing simple wireless communication between the electronic devices, e.g., transmitting advertising or beacon frames and/or scanning for advertising frames transmitted by other electronic devices as described previously.

Within the electronic device 500, the processing subsystem 510, the memory subsystem 512, and the networking subsystem 514 are coupled together using a bus 528. The bus 528 may include an electrical, optical, and/or electro-optical connection that the subsystems can use to communicate commands and data among one another. Although only one bus 528 is shown for clarity, different embodiments can include a different number or configuration of electrical, optical, and/or electro-optical connections among the subsystems.

In some embodiments, the electronic device 500 includes a display subsystem 526 for displaying information on a display, which may include a display driver and the display, such as a liquid-crystal display, a multi-touch touchscreen, etc.

The electronic device 500 can be (or can be included in) any electronic device with at least one network interface. For example, the electronic device 500 can be (or can be included in): a desktop computer, a laptop computer, a subnotebook/netbook, a server, a tablet computer, a smartphone, a cellular telephone, a smartwatch, a consumer-electronic device, a portable computing device, a controller, test equipment, and/or another electronic device.

Although specific components are used to describe the electronic device 500, in alternative embodiments, different components and/or subsystems may be present in the electronic device 500. For example, the electronic device 500 may include one or more additional processing subsystems, memory subsystems, networking subsystems, and/or display subsystems. Additionally, one or more of the subsystems may not be present in the electronic device 500. Moreover, in some embodiments, the electronic device 500 may include one or more additional subsystems that are not shown in FIG. 7. Also, although separate subsystems are shown in FIG. 7, in some embodiments some or all of a given subsystem or component can be integrated into one or more of the other subsystems or component(s) in the electronic device 500. For example, in some embodiments the program instructions 522 are included in the operating system 524 and/or the control logic 516 is included in the interface circuit 518. In some embodiments, the security technique is implemented using information in layer 2 and/or layer 3 of the Open System Interconnection model.

Moreover, the circuits and components in the electronic device 500 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of the networking subsystem 514 (or, more generally, of the electronic device 500). The integrated circuit may include hardware and/or software mechanisms that are used for transmitting wireless signals from the electronic device 500 and receiving signals at the electronic device 500 from other electronic devices. Aside from the mechanisms herein described, radios are generally known in the art and hence are not described in detail. In general, the networking subsystem 514 and/or the integrated circuit can include any number of radios. Note that the radios in multiradio embodiments function in a similar way to the described single-radio embodiments.

In some embodiments, the networking subsystem 514 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals.)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

The electronic device 500 may be used with a wide variety of communication protocols and, more generally, wired and/or wireless communication techniques. Thus, the described security technique may be used with a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the security technique may be implemented using the program instructions 522, the operating system 524 (such as a driver for the interface circuit 518) or in firmware in the interface circuit 518. Alternatively or additionally, at least some of the operations in the security technique may be implemented in a physical layer, such as hardware in the interface circuit 518.

In the preceding description, we refer to 'some embodiments.' Note that 'some embodiments' describes a subset of all of the possible embodiments, but does not always specify the same subset of embodiments. Moreover, note that numerical values in the preceding embodiments are illustrative examples of some embodiments. In other embodiments of the security technique, different numerical values may be used.

After reading this application, those skilled in the art would recognize that these definitions would be applicable to techniques, methods, physical elements, software elements, combinations or conjunctions of physical elements and software elements, and systems—currently known, or not currently known to be applicable by the techniques described herein—extensions thereof that would be inferred by those skilled in the art after reading this application, even if not obvious to those of ordinary skill in the art before reading this application.

The claims are incorporated into the specification as if fully set forth herein.

The invention claimed is:

1. An electronic device, comprising:
   a network node; and
   an interface circuit, coupled to the network node, configured to communicate with a second electronic device;
   memory configured to store program instructions and secure data;
   a processor, coupled to the memory, configured to execute the program instructions, wherein, when executed by the processor, the program instructions cause the electronic device to perform operations comprising:
     creating a current unique identifier associated with the electronic device whenever a condition occurs, wherein the condition comprises one of: when the electronic device is turned on, or when there is unauthorized access to the secure data;
     generating a fingerprint associated with the electronic device, wherein the fingerprint comprises a secure combination of the current unique identifier associated with the electronic device and additional information;
     providing, from the network node, one or more packets or frames intended for the second electronic device, wherein the one or more packets or frames convey the fingerprint;
     receiving a security request or determining a predefined time interval has elapsed;
     providing, from the network node, a request for the fingerprint intended for the second electronic device in response to the security request or the determination;
     receiving, at the network node, one or more second packets or frames associated with the second electronic device, wherein the one or more second packets or frames convey the fingerprint;
     generating a second fingerprint associated with the electronic device, wherein the second fingerprint comprises a secure combination of the current unique identifier associated with the electronic device and additional information;
     comparing the fingerprint and the second fingerprint; and
     when the fingerprint and the second fingerprint are different, performing a remedial action.

2. The electronic device of claim 1, wherein the unique identifier comprises a random number or a pseudorandom number.

3. The electronic device of claim 1, wherein the secure combination comprises a secure one-way hash.

4. The electronic device of claim 1, wherein the addition information comprises one of: a QR code, an image, or a number.

5. The electronic device of claim 1, wherein the operations comprise:
prior to providing the one or more packets or frames, encrypting the fingerprint using an encryption key stored in the memory, wherein the fingerprint conveyed in the one or more packets or frames and the one or more second packets or frames comprises the encrypted fingerprint; and
prior to comparing the fingerprint and the second fingerprint, de-encrypting the fingerprint received in the one or more second packets or frames.

6. The electronic device of claim 1, wherein the security request is associated with a user of the electronic device and the security request is received via a user interface in the electronic device.

7. The electronic device of claim 1, wherein the predefined time interval is since a previous instance of a comparison involving the fingerprint.

8. The electronic device of claim 1, wherein the remedial action comprises one of: providing or displaying an alert, providing or displaying a recommendation, or destroying the secure data.

9. The electronic device of claim 1, wherein the memory and the processor are included in a secure enclave in the electronic device.

10. A non-transitory computer-readable storage medium for use in conjunction with an electronic device, the computer-readable storage medium storing program instructions that, when executed by a processor in the electronic device, causes the electronic device to perform operations comprising:
creating a current unique identifier associated with the electronic device whenever a condition occurs, wherein the condition comprises one of: when the electronic device is turned on, or when there is unauthorized access to secure data stored in memory in the electronic device;
generating a fingerprint associated with the electronic device, wherein the fingerprint comprises a secure combination of the current unique identifier associated with the electronic device and additional information;
providing one or more packets or frames intended for a second electronic device, wherein the one or more packets or frames convey the fingerprint;
receiving a security request or determining a predefined time interval has elapsed;
providing a request for the fingerprint intended for the second electronic device in response to the security request or the determination;
receiving one or more second packets or frames associated with the second electronic device, wherein the one or more second packets or frames convey the fingerprint;
generating a second fingerprint associated with the electronic device, wherein the second fingerprint comprises a secure combination of the current unique identifier associated with the electronic device and additional information;
comparing the fingerprint and the second fingerprint; and
when the fingerprint and the second fingerprint are different, performing a remedial action.

11. The non-transitory computer-readable storage medium of claim 10, wherein the unique identifier comprises a random number or a pseudorandom number.

12. The non-transitory computer-readable storage medium of claim 10, wherein the secure combination comprises a secure one-way hash.

13. The non-transitory computer-readable storage medium of claim 10, wherein the addition information comprises one of: a QR code, an image, or a number.

14. The non-transitory computer-readable storage medium of claim 10, wherein the operations comprise:
prior to providing the one or more packets or frames, encrypting the fingerprint using an encryption key stored in the memory, wherein the fingerprint conveyed in the one or more packets or frames and the one or more second packets or frames comprises the encrypted fingerprint; and
prior to comparing the fingerprint and the second fingerprint, de-encrypting the fingerprint received in the one or more second packets or frames.

15. The non-transitory computer-readable storage medium of claim 10, wherein the security request is associated with a user of the electronic device and the security request is received via a user interface in the electronic device.

16. The non-transitory computer-readable storage medium of claim 10, wherein the predefined time interval is since a previous instance of a comparison involving the fingerprint.

17. The non-transitory computer-readable storage medium of claim 10, wherein the remedial action comprises one of: providing or displaying an alert, providing or displaying a recommendation, or destroying the secure data.

18. The non-transitory computer-readable storage medium of claim 10, wherein the memory and the processor are included in a secure enclave in the electronic device.

19. A method for performing a comparison, comprising: by a processor in an electronic device:
creating a current unique identifier associated with the electronic device whenever a condition occurs, wherein the condition comprises one of: when the electronic device is turned on, or when there is unauthorized access to secure data stored in memory in the electronic device;
generating a fingerprint associated with the electronic device, wherein the fingerprint comprises a secure combination of the current unique identifier associated with the electronic device and additional information;
providing one or more packets or frames intended for a second electronic device, wherein the one or more packets or frames convey the fingerprint;
receiving a security request or determining a predefined time interval has elapsed;
providing a request for the fingerprint intended for the second electronic device in response to the security request or the determination;
receiving one or more second packets or frames associated with the second electronic device, wherein the one or more second packets or frames convey the fingerprint;
generating a second fingerprint associated with the electronic device, wherein the second fingerprint comprises a secure combination of the current unique identifier associated with the electronic device and additional information;
comparing the fingerprint and the second fingerprint; and
when the fingerprint and the second fingerprint are different, performing a remedial action.

20. The method of claim 19, wherein the method comprises:
prior to providing the one or more packets or frames, encrypting the fingerprint using an encryption key stored in the memory, wherein the fingerprint conveyed in the one or more packets or frames and the one or more second packets or frames comprises the encrypted fingerprint; and prior to comparing the fingerprint and the second fingerprint, de-encrypting the fingerprint received in the one or more second packets or frames.

\* \* \* \* \*